United States Patent [19] [11] 3,720,422
Nelson [45] March 13, 1973

[54] MINI-DOLLY FOR TRANSPORTING VEHICLES

[76] Inventor: Arthur W. Nelson, 180 Bayview Ave., East Islip, N.Y. 11730

[22] Filed: Feb. 3, 1971

[21] Appl. No.: 112,262

[52] U.S. Cl. ................................. 280/35, 280/79.1
[51] Int. Cl. ................................................ B62b 11/00
[58] Field of Search ........................... 280/35, 79.1; 214/330–333

[56] References Cited

UNITED STATES PATENTS

| 3,583,723 | 6/1971 | Nowell | 280/79.1 |
| 2,380,415 | 7/1945 | Carruthers | 280/35 UX |
| 3,066,946 | 12/1962 | Nelson | 280/35 X |
| 2,543,276 | 2/1951 | Buechler | 214/332 |
| 2,392,830 | 1/1946 | Baum | 280/79.1 UX |
| D153,989 | 5/1949 | Snyder | 280/79.1 X |
| 2,252,534 | 8/1941 | Trotter | 214/332 |
| 2,362,981 | 11/1944 | Baum | 214/332 |

Primary Examiner—Leo Friaglia
Assistant Examiner—Robert R. Song
Attorney—Friedman & Goodman

[57] ABSTRACT

A mini-dolly for transporting vehicles comprising an elongate frame, the latter including a pair of opposite wheel-carrying portions longitudinally spaced from one another. The elongate frame includes a pair of cooperating receptacle members connected thereto, the receptacle members having an adjustable configuration relative to one another for cooperatively receiving a vehicular member such as the wheel of a disabled vehicle. The elongate frame is telescopically adjustable for adjusting both the longitudinal extent thereof and the effective vehicular member receiving configuration of the receptacle members relative to one another. The elongate frame includes two mutually interfitting portions one in the other between the wheel-carrying portion thereof for constituting the telescopic arrangement thereof. The receptacle members are pivotally arranged at the opposite wheel-carrying portions of the frame respectively and may be inclined relative to one another pivotally to support the wheel of the disabled vehicle.

8 Claims, 8 Drawing Figures

ARTHUR W. NELSON
INVENTOR

BY Friedman and Goodman
ATTORNEYS

3,720,422
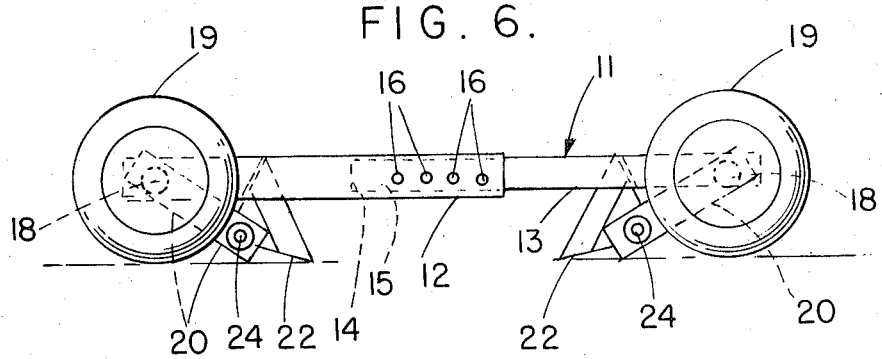
FIG. 6.
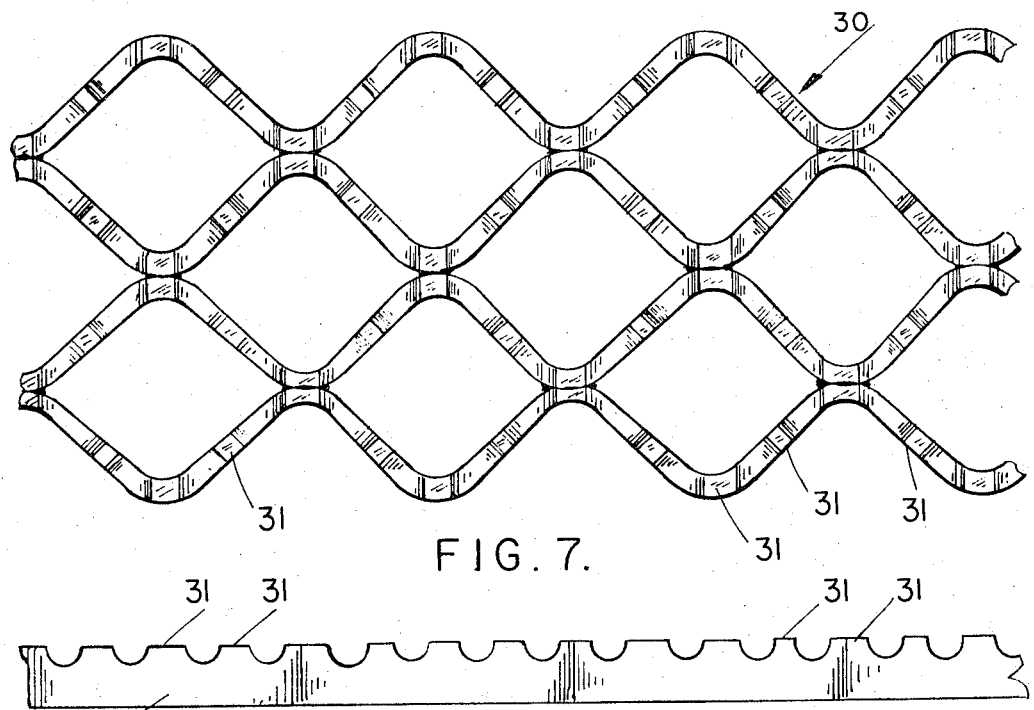
FIG. 7.
FIG. 8.
ARTHUR W. NELSON
INVENTOR
BY Friedman and Goodman
ATTORNEYS 3,720,422

MINI-DOLLY FOR TRANSPORTING VEHICLES

BACKGROUND OF THE INVENTION

The present invention relates to transportation, and more particularly to means for transporting a disabled vehicle from the disabled location thereof to a location where the vehicle may be safely repaired.

Numerous devices have been developed heretofore for enabling a vehicle to be transported from its disabled location to a location for repair of the latter. These devices are generally dollies or the like, which dollies cooperate with the disabled vehicle and generally obviate the necessity for elevating the disabled end of the vehicle by means of a tow-truck, which latter procedure is cumbersome and may damage the operative parts of the vehicle, such as the automatic transmission thereof, when the rear wheels of the vehicle which are operatively connected to the transmission remain in engagement with the ground. Clearly, therefore, the provision of a dolly for removing the disabled wheel and/or the rear wheels of the vehicle from the ground which may otherwise cause damage to the transmission in the absence of lifting same from the ground is an important step forward in the art.

However, the conventional type of dolly which is utilized for this purpose suffers from a serious disadvantage in that the conventional dolly may not be sufficiently adjusted for supporting the disabled wheel of the vehicle. Thus, as the conventional dolly is used for transporting the vehicle, it is very possible that the disabled wheel of the vehicle may undesirably be shifted outwardly of the dolly as the vehicle is transported therein due to excessive vibrations caused by defective roads. The adjustment of the dolly is usually necessary since, in fact, the vehicles generally differ from one another with respect to the size of their wheels respectively, i.e., truck wheels, conventional automobile wheels, and the smaller sports car wheels. It is clear, therefore, that the conventional type of dolly utilized for transporting vehicles is unsatisfactory as it cannot be adjusted to adequately maintain the disabled vehicular wheel therein and therefore there exists a void in the art.

SUMMARY OF THE INVENTION

Accordingly, it is an object of the present invention to provide a dolly which may be utilized for transporting disables vehicles.

It is a further object of the present invention to provide a dolly for transporting disabled vehicles, which dolly is provided with a reliable and adjustable structure for cooperating with the disabled wheel of the vehicle.

It is another object of the present invention to provide a dolly which includes a pair of adjustable receptacle members that cooperate with one another for receiving the disabled wheel of a vehicle.

It is still a further object of the present invention to provide a dolly for transporting disabled vehicles with receptacle members that cooperatively prevent both longitudinal and lateral displacement of the disabled wheel carried therein relative to the dolly itself.

It is another object of the present invention to provide a dolly that may be disposed relative to the underside of the disabled wheel of the vehicle and then adjusted to receive and carry the wheel of the vehicle without the necessity for first elevating the vehicle relative to the dolly.

It is another object of the present invention to provide a dolly that is easily stored and carried from location to location readily, easily and effectively.

BRIEF DESCRIPTION OF THE DRAWINGS

With the above and additional objects and advantages in view as will hereinafter appear, this invention comprises the devices, combinations, and arrangements of parts hereinafter described and illustrated in the accompanying drawings of a preferred embodiment in which:

FIG. 6 illustrates a generally front view of the dolly of the present invention with the receptacle members thereof in a position as generally illustrated in FIG. 4;

FIG. 7 illustrates a generally plan view of a fragment of the grating of the upper surface of the receptacle members; and FIG. 8 illustrates a front view of the fragment of the grating as illustrated in FIG. 7.

DETAILED DESCRIPTION OF THE INVENTION

Figure 1:
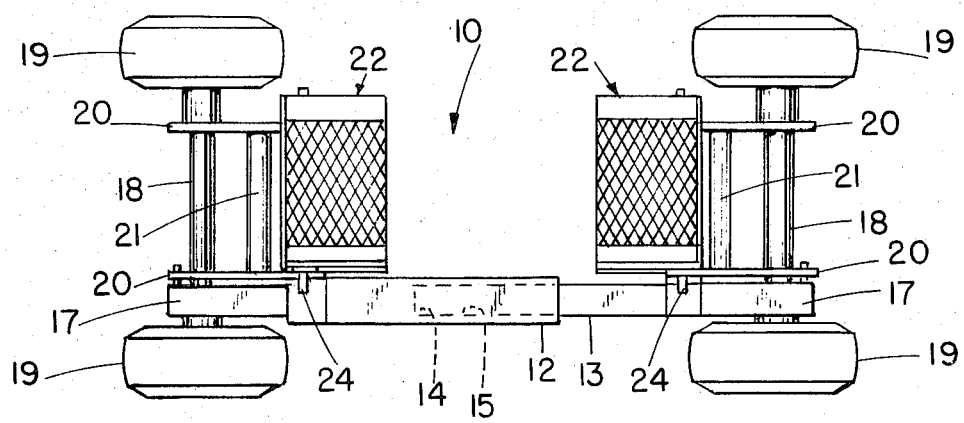
FIG. 1 illustrates a top plan view of the dolly according to the present invention

Referring now to the drawing as illustrated in FIG. 1, a mini-dolly generally characterized by the reference character 10 includes an elongate frame 11 which is constituted by a pair of telescopically arranged bars 12 and 13. An exposed elongate channel 14 is provided in the bar 12 for receiving the end portion 15 of the bar 13 in telescopic relation. The bar 12 is provided with a plurality or a series of openings 16 which communicate transversely with the channel 14. These openings 16 are utilized for adjusting the elongate extent of the frame 11 in that the end portion 15 of the bar 13 can be inserted into the channel 14 over selective degrees and be maintained in the inserted position by any conventional means such as a threaded clamping set screw which may be cooperatively received by the openings 16. As is clearly illustrated in FIGS. 1, 2 and 6, the elongate frame 11 includes a pair of generally identical opposite end wheel-carrying portions 17. Each of the wheel-carrying portions 17 is provided with an axle 18 freely journaled therein. The axles 18 support the wheels 19 in rectangular array as illustrated in FIG. 1.

Each of the axles 18 is provided with a pair of pitmans 20 freely journaled thereon, which pitmans 20 are fixedly associated with one another by means of a brace 21 which extends transversely of a pair of the pitmans 20 for interconnecting the latter. A pair of receptacle members 22 are pivotally connected respectively to each pair of pitmans 20 at the free end of the latter and may be pivotally inclined relative to one another for cooperatively defining a receptacle and receiving a vehicular member such as a wheel of a disabled vehicle as will be further discussed below.

Figure 2:
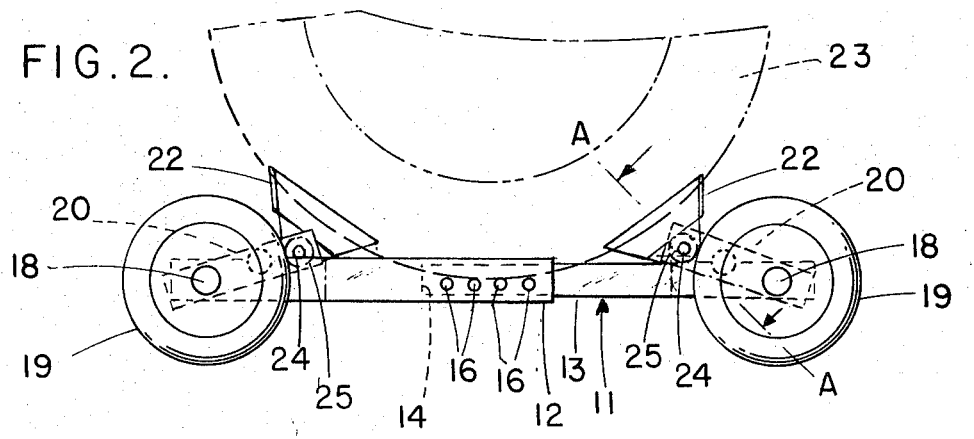
FIG. 2 illustrates an elevational view of the dolly according to the present invention and its operative association with a wheel of a disabled vehicle, the wheel shown in phantom.

Each of the receptacle members 22 are provided with a spring-biased plunger-abutment 24 for detachably maintaining the receptacle members above the elongate frame 11 as illustrated in FIG. 2. The plunger-abutments 24 are axially displaceable within hollow bars 25 respectively, which hollow bars 25 are utilized for pivotally connecting the receptacle members 22 to the aforesaid pitmans 20. Each of the hollow bars 25 carries a spring 26 for urging the respective plunger-abutments 24 outwardly and transversely of the frame 11. Each plunger-abutment 24, when in its outermost position, engages the uppermost surface of the elongate frame 11 and thus acts to prevent the pivotal displacement of the pitmans 20 and thereby receptacle members 22 below the elongate frame 11.

Figures 3, 4:
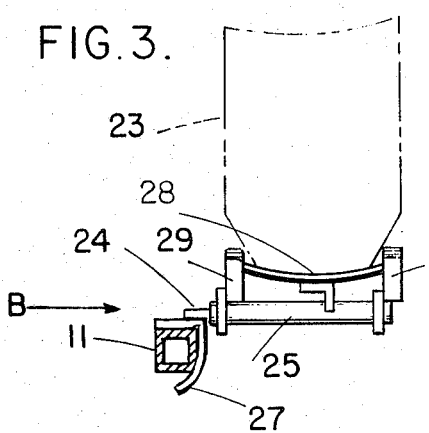
FIG. 3 illustrates a view of the receptacle members of the dolly of the present invention in their elevated operative association with the wheel of a disabled vehicle, the wheel shown in phantom, the side view taken partially in cross-section through the line A—A in FIG. 2.
FIG. 4 illustrates a view similar to that of FIG. 3, showing the operative association of the receptacle members of the dolly with that of the disabled wheel of the vehicle, the latter shown in phantom, the receptacle being illustrated in its lowermost position so that it may be positioned conveniently for receiving the disabled wheel of the vehicle.
Figure 5:
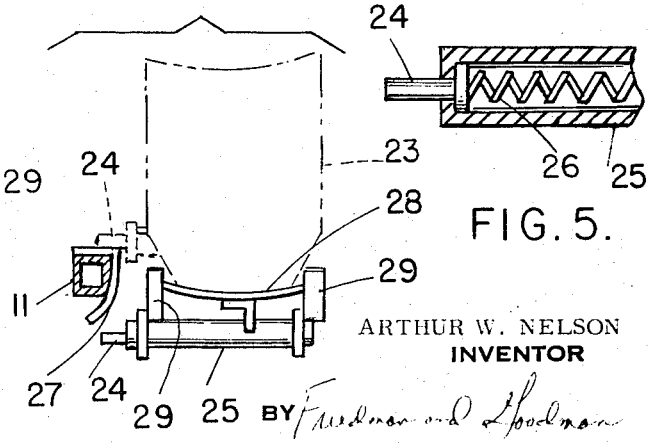
FIG. 5 illustrates a generally cross-sectional view of the plunger for each of the receptacle members maintaining the receptacle members in a position as illustrated in FIG. 2.

As clearly illustrated in FIG. 2, the receptacle member 22 may be pivotally inclined relative to one another for receiving the wheel or tire 23 of a disabled vehicle. FIG. 3 illustrates the upper position of a receptacle member 22 with its associated plunger-abutment 24 in contact with the upper surface of the elongate frame 11. It is clear that each plunger-abutment 24 may be depressed in the direction of arrow B in FIG. 3 to release the receptacle member 22 from its upper position to that of a lower position as illustrated in FIGS. 4 and 6 respectively. Each plunger-abutment 24 is readily accessible when the receptacle members 22 are in their upper position relative to the elongate frame 11. Thus, the receptacle members 22 may be moved into their lower positions as shown in FIG. 6 simply by depressing the plunger 24 in the direction of arrow B. However, when the receptacle members 22 are to be elevated from their lower position to their upper carrying positions, the plungers 24 cooperate with respective camming members 27, the latter being fixedly associated with the frame 11. In this respect, each plunger-abutment 24 simply rides along the inner camming face of its associated camming member 27 and is self-depressed thereby so that the receptacle members 22 can be elevated to their upper carrying positions as illustrated in FIG. 2.

In operation, therefore, the mini-dolly according to the present invention, may be utilized simply by disposing the elongate frame 11 thereof adjacent a disabled vehicle such that the receptacle members 22 in their lower position as illustrated in FIG. 6, generally embrace the disabled wheel of the vehicle. At this point, a jack or other lever is utilized for elevating the receptacle members 22 such that they respectively contact the underside of the disabled wheel. In this respect, the lever is simply disposed between an axle 18 and a brace 21 and then pressure is urged against the upper portion of the jack or lever such that the lower portion jack contacts the upper side of the axle 18 and the underside of the brace 21 so as to elevate the respective pitman pairs 20 and thus displace the receptacle members 22 into contact with the disabled tire of the vehicle. As downward pressure is continued against the lever or jack, the plunger-abutment 24 rides along the camming member 27 and is depressed by the latter so as to permit the respective receptacle members 22 to be elevated beyond the upper face of the elongate frame 11. Once the hollow bars 25 are disposed above the elongate frame 11, the plunger-abutments 24 snap outwardly and restrain or resist the pitmans 20 and thereby the receptacle members from being moved downwardly by the weight of the vehicle. Each of the receptacle members 22 are elevated as aforesaid by the aforementioned jack or lever. The jack or lever is simply a straight rigid bar as those skilled in the art readily appreciate and further description thereof is omitted.

It is noteworthy that the vehicles generally employed on the highway differ from one another both in size and weight. These vehicles which differ from one another may be trucks, conventional cars or the smaller sports cars. As a result, the wheels of these vehicles, respectively, tend to differ from one another both in size and weight and, therefore, a dolly which is used for transporting these vehicles should be constituted so as to be adjustable for accommodating selected of these wheels. The adjustable nature of the mini-dolly must be such since the dolly itself is utilized for supporting a single wheel, i.e., the disabled wheel of the vehicle, and as the vehicle is transported it is very possible that its disabled wheel may be dislodged outwardly of the receptacle members 22 should the receptacle members 22 fail to exert forces which adequately prevent both the longitudinal and lateral displacement of the vehicular wheel thereon.

In this respect, since the mini-dolly, according to the present invention, is telescopically adjustable, the spaced relationship between the receptacle members 22 may be adjusted and therefore the incline of the respective supporting faces of the receptacle members 22 which contact the disabled wheel can be most effectively inclined relative to one another such that opposing forces are properly exerted against the wheel to most effectively resist longitudinal displacement of the latter wheel. It is clear that if the receptacle members 22 are inclined relative to one another such that imaginary tangential planes which pass along the surface of the receptacle members 22 respectively in contact with the vehicular wheel therein extend at an angle or approach one another at an angle of 180° relative to one another, there will be minimal longitudinally opposing forces exerted for maintaining the vehicular wheel therein. It is clear therefore, that these imaginary tangential planes should be inclined relative to one another at an angle of approximately 90° to most efficiently resist longitudinal displacement of the vehicular wheel relative to the elongate frame 11.

The present invention clearly allows for the adjustment of the aforementioned imaginary tangential planes since, in fact, the elongate frame 11 is telescopically arranged and, thus, if an enlarged tire such as that of a truck is to be disposed between the receptacle members 22, the elongate frame 11 can be similarly enlarged so as to adjust the angle between the receptacle members 22 relative to one another, Similarly, if a small wheel such as that of a sports car is to be positioned between the receptacle members 22, the elongated frame 11 can be reduced in length to again most effectively position or adjust the receptacle members 22 relative to one another.

Another difficulty encountered with a mini-dolly of the above nature is that of preventing lateral displacement of the disabled tire relative to the mini-dolly, i.e., displacement of the tire transversely of the elongate frame 11 when the mini-dolly is in motion. In order to resist the lateral displacement of the vehicular tire relative to the mini-dolly 10, the upper face 28 of the receptacle members 22 as illustrated in FIGS. 3 and 4 has an arcuate lateral extend to embrace generally to the tire portion in contact therewith to promote resistance against the lateral displacement of the vehicular tire relative to the receptacle members 22. Furthermore, in order to enhance the lateral resistance against the motion or displacement of the tire, the receptacle members 22 are provided with a pair of opposing lips 29 for engaging opposite lateral faces of the tire to more adequately resist displacement thereof.

Another feature of the contour of the arcuate lateral extent of the upper face 28 of the receptacle members 22 is that they are provided with a grated surface 30 as illustrated in FIG. 7, which grated surface 30 is provided with a plurality of spaced upwardly extending projections 31 for more adequately gripping the underside of the tire in contact therewith. These projections 31 act to partially embed themselves in the grooves of the tire and in combination with the arcuate lateral extent thereof and the lips 29, there is fully effected a resistance to lateral displacement of the tire relative to the elongate frame 11.

It is clear from the above description that the mini-dolly according to the present invention, is readily adjustable for accommodating all kinds of vehicles and most effectively resists displacement of the vehicle when seated therein both longitudinally and laterally of the dolly.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. A mini-dolly comprising an elongate frame, said elongate frame including a pair of opposite wheel-carrying portions longitudinally spaced from one another, receptacle means connected to said elongate frame and having an adjustable configuration fro receiving a vehicular member, said receptacle means including a pair of spaced receptacle members mutually cooperable with one another for receiving a vehicular member and pivotally associated respectively with each of said wheel-carrying portions of said elongate frame, each of said receptacle members including an arcuate lateral extent extending transversely of said elongate frame to carry and resist movement of the vehicular member receivable therein transversely of said elongate member, each of said receptacle members further including a pair of opposing lips for engaging opposite lateral faces of the vehicular member to resist lateral displacement thereof, said arcuate lateral extent of each of the receptacle members including grated means for gripping the vehicular member, said grated means including a grated surface provided with a plurality of spaced projections extending upwardly from said grated surface, telescopic means for telescopically adjusting longitudinal extent of said elongate frame and space between said receptacle members to effect the vehicular member-receiving configuration of said receptacle means, said telescopic means including two mutually interfitting portions disposed one in the other between and connected respectively to said wheel-carrying portions, one telescopic portion provided with an elongate channel having an open-end portion, the other telescopic mean portion being insertable into said open-end portion of said channel, securing means for adjustably locking said channel and said insertable portion relative to one another to maintain the longitudinal extent of said elongate frame and the space between said receptacle members, said channel being provided with a plurality of spaced openings adjacent said open-end portion, said openings communicating transversely with said channel, said securing means being engageable with said insertable portion in said channel through said openings.

2. A mini-dolly as claimed in claim 1, wherein said channel and the portion insertable therein have substantially identical cross-sections operatively associated flushly with one another.

3. A mini-dolly as claimed in claim 1, wherein each of said wheel-carrying portions of said elongate frame respectively includes a pair of wheels and an axle interconnecting each said pair of wheels, each said axle extending parallel to the other and transversely of said elongate frame.

4. A mini-dolly as claimed in claim 3, wherein each of said spaced receptacle members respectively includes support means each having two points of pivotal articulation relative to an associated wheel-carrying portion thereof respectively.

5. A mini-dolly as claimed in claim 4, wherein said support means of each of said receptacle members includes a respective pitman, each said pitman including opposite end portions, one of said end portions of each said pitman being pivotally connected to a respective one of said axles, the other of said end portions of each of said pitman being pivotally connected to a respective one of said receptacle members.

6. A mini-dolly as claimed in claim 5, wherein the end portion of each said pitman which is pivotally connected to said receptacle members respectively is selectively displaceable between two extreme position, one position, being above and the other position being below said elongate frame.

7. A mini-dolly as claimed in claim 6, wherein each said pitman includes a spring-biased plunger-abutment selectively displaceable transversely of the respective pitman and engageable with said elongate frame for both removably maintaining said receptacle members respectively above said elongate frame and permitting displacement of said receptacle members respectively below said elongate frame.

8. A mini-dolly as claimed in claim 7, wherein said elongate member includes a pair of camming members spaced from one another and engageable respectively by each said spring-biased plunger-abutment at a position below said elongate frame to permit self-depression of each said plunger and elevation of said receptacle members to a position above said elongate member.

* * * * *